3,459,825
CATALYST AND PROCESS FOR DIMERIZATION
OF OLEFINS
Gert G. Eberhardt, Philadelphia, Pa., and William P.
 Griffin, Jr., Wilmington, Del., assignors to Sun Oil
 Company, Philadelphia, Pa., a corporation of New
 Jersey
No Drawing. Filed Oct. 26, 1967, Ser. No. 678,211
Int. Cl. C07c 3/10
U.S. Cl. 260—683.15                           40 Claims

ABSTRACT OF THE DISCLOSURE

Monoolefins are dimerized by contact at a temperature in the range of $-100°$ C. to $200°$ C., preferably $-50°$ C. to $100°$ C., with novel catalyst systems formed by combining (1) a trihalonickelate complex having the formula $(R_4Q)^+(R_3PNiX_3')^-$ wherein Q is phosphorous or nitrogen with (2) a Lewis acid which is $RAlX_2$, $R_3Al_2X_3$ or $R_2AlX$. The proportions of the catalyst components are such that the atomic ratio of Al:Ni is in excess of 2:1. The catalysts are used in solution in a suitable liquid medium, e.g., toluene or chlorobenzene.

Cross reference to related application

Application Ser. No. 551,953, filed May 23, 1966 and now abandoned, describes catalyst systems formed by combining (1) certain nickel halide phosphine complexes, e.g., $(R_3P)_2NiCl_2$, with (2) hydrocarbyl aluminum halides, which catalyst systems are highly active for dimerizing olefins. The present invention provides different catalyst systems which are made from another class of halonickel complexes and which exhibit even higher activity.

Background of the invention

This invention relates to novel catalyst compositions made from a certain type of nickel (II) complex and to their use in the dimerization and/or codimerization of olefinic hydrocarbons.

In the prior art it has been disclosed (Wilke, Angew. Chem., 78, No. 3, 1966, pps. 170–171; Dutch patent application 6,409,179, filed Aug. 10, 1963) that olefins can be oligomerized by means of catalysts formed by combining π-allyl nickel halide phosphine complexes with Lewis acids such as alkyl aluminum dihalides. For example, propylene can be dimerized mainly to 2-methylpentenes by contact with a chlorobenzene solution of a catalyst formed from π-allyl nickel iodide, triphenylphosphine and ethylaluminum dichloride. If tricyclohexylphosphine is used in the mixture in place of triphenylphosphine, the resulting dimer is mainly 2,3-dimethylbutenes.

It has also been disclosed heretofore (Ewers, Angew. Chem., 78, No. 11, 1966, p. 593) that propylene can be dimerized by a catalyst system formed by combining nickelacetylacetonate, triphenylphoshine and a Lewis acid, e.g., ethylaluminum sesquichloride.

Summary of the invention

The invention provides novel nickel-containing catalyst systems formed from a new combination of catalytic components. These new catalysts exhibit exceptionally high activity in dimerizing or codimerizing ethylene, propylene and higher olefins. They are used for this purpose in solution in asuitable solvent, such as a liquid aromatic hydrocarbon or halohydrocarbon, or dissolved in excess liquid monomer.

In accordance with the invention, novel catalyst systems are provided by combining (1) a trihalonickelate complex having the formula $(R_4Q)^+(R_3PNiX_4')^-$ with (2) a Lewis acid of the group $RAlX_2$, $R_3Al_2X_3$ and $R_2AlX$, wherein Q is phosphorous or nitrogen, X' is chlorine, bromine or iodine, X is chlorine or bromine, and all R's are hydrocarbyl radicals (which can be the same or different hydrocarbyls) except that when Q is phosphorous one of the R's in the $(R_4Q)^+$ cation can be hydrogen and when Q is nitrogen all R's in said cation are hydrocarbyl groups having at least two carbon atoms, the atomic ratio of Al:Ni in the system being in excess of 2:1 and preferably well in excess of this ratio. Dimerization of monoolefin hydrocarbons is readily effected by contacting the monomer with a solution of the catalyst at a temperain the range of $-100°$ C. to $200°$ C., more preferably $-50°$ C. to $100°$ C.

Description of the invention

The trihalonickelate compounds used in making the present catalysts are quaternary salts of either nitrogen or phosphorous having, respectively, the following formulas:

The active catalyst species results from combining such trihalonickelate compound with a Lewis acid which is a hydrocarbyl aluminum chloride or bromide corresponding to any of the following formulas: $RAlX_2$; $R_3Al_2X_3$; and $R_2AlX$. In other words the Lewis acid is a hydrocarbyl aluminum dihalide, sesquihalide or monohalide wherein the halogen (X) is chlorine or bromine. Best results are obtained with the sesquihalides, while the dihydrocarbyl aluminum monohalides give catalyst systems of lowest activity.

The Lewis acid and trihalonickelate compound are used in such proportions that the Al:Ni ratio is in excess of 2:1 and preferably is at least 10:1.

In the foregoing formulas, the R's, both in the trihalonickelate compounds and in the Lewis acids, represent any hydrocarbon radical having 1–30 carbon atoms selected from the group consisting of alkyl, cycloalkyl, alkenyl, cycloalkenyl, aryl, aralkyl, and aralkenyl, with the following exceptions: (1) when a quaternary phosphorous salt is used (Q=P), one of the R's in the $(R_4Q)^+$ cation can be hydrogen; and (2) when a quaternary nitrogen salt is used (Q=N), all R's in the $(R_4Q)^+$ cation are hydrocarbyl groups having at least two carbon atoms. The R groups shown in the formulas can be either the same or different hydrocarbyl groups, and the R's are intended to indicate any such groups with the exceptions specified above. It is preferred that each R group present in the catalyst components have not more than eight carbon atoms.

The types of hydrocarbyl group or groups present in the $R_3P$ moiety of the nickel compound can have an important influence on the structure of the dimer product as more fully discussed below. Such R group or groups as well as the other R groups in the catalyst components can also have an influence with respect to degree of solubility of the resulting catalyst. However any R groups as specified above the oeprative for preparing catalyst systems in accordance with the invention.

The present catalysts can be used for converting monoolefins to oligomers which are mainly dimers of the starting olefins. Any such olefins, whether being terminal or internal olefins, can be made to dimerize and/or codimerize by means of these catalysts, provided that the olefin has its double bond between two carbon atoms neither of which is attached to more than one carbon atom. This applies to straight chain and branched aliphatic olefins as well as to cyclic olefins. In other words the present catalysts can be employed for converting to oligomers (mainly to dimers) any monoolefin in which the double bond is between carbon atoms that have no side substituent such as a methyl group or higher side chain. The catalysts are particularly useful for effecting the dimerization or codimerization of $C_2$-$C_{10}$ aliphatic monoolefins, such as the following: ethylene; propylene; butene-1; butene-2; pentene-1; pentene-2; pentene-3; 4-methylpentene-1; 3,3-dimethylbutene-1; 3,4-dimethylpentene-1; octene-1; 2,5-dimethylhexene-3; 4-ethylhexene-2; nonenes; etc. Examples of other olefins that can be made to dimerize by means of the present catalysts are dodecenes; cetenes; eicosenes; docosenes; cyclopentene; cyclohexene; methylcyclohexenes; dimethylcyclohexenes; and cyclooctene; in all of which olefins the carbon atoms forming the double bond have no side substituents. When two or more olefins are present in the charge, codimerization will occur as well as dimerization. Hence, when the term "dimerization" is used herein, it is intended to include codimerization as well as if the olefinic charge material contains more than one olefins component.

The present catalysts when contacted with conjugated diolefins, such as butadiene or isoprene, or with styrene or alpha-methylstyrene will, instead of effecting dimerization, cause polymerization to occur to yield high molecular weight rubbery or hard polymers. Non-conjugated diolefins when contacted with the catalyst tend to isomerize into conjugation and likewise then polymerize to high polymers.

The dimerization reaction can be carried out by contacting a monoolefin as above specified or a mixture of such olefins with a solution of the catalyst at a temperature in the range of $-100°$ C. to $200°$ C., more preferably $=50°$ C. to $100°$ C. The rate of dimerization at any selected reaction temperature will depend upon the particular olefinic charge employed, and will vary inversely with the molecular weight of the starting olefin. The rate also will depend upon the accessibility of the double bond for contact with the catalyst species. The reaction preferably is carried out employing a solvent which has some degree of polarity, although it can also be effected in many cases without such solvent by utilizing excess olefin charge material as solvent. Suitable solvents are described in more detail hereinafter. When a solvent is not employed and an excess of olefin is used instead as solvent, the R groups in the nickelate component of the catalyst should contain sufficient carbon atoms to impart thereto substantial solubility in the olefin employed.

The reaction product obtained is preponderantly the dimer and/or codimer, or in other words is product resulting from the combination of two molecules of charge olefin per molecule of product. However, minor amounts of higher molecular weight olefins usually are also obtained, perhaps due to interaction of dimer or codimer product with additional charge material or with itself. As a general rule the amount of these higher boiling products can be held to less than 20% by weight of the total olefin reacted by maintaining a relatively high concentration of monomer in the reaction mixture.

The manner in which two molecules of the starting olefin combine to yield the dimer will depend upon the particular R groups in the phosphine component, i.e., the $R_3P$ moiety, of the catalyst system. For example, when propylene is the charge olefin, R groups in the $R_3P$ moiety that impart thereto relatively high electron-accepting character, such as phenyl, tolyl, or naphthyl, tend to result in methylpentenes as the predominant product structure. In such cases the reaction takes place mainly as follows:

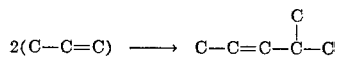

On the other hand, R groups which impart an electron-donating character to the $R_3P$ moiety, such as isopropyl, t-butyl or cyclopentyl, tend to cause 2,3-dimethylbutenes to be the main product. In such cases the dimerization reaction proceeds mainly as follows:

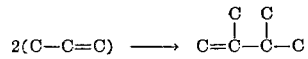

Hence the invention allows different specific dimers to be obtained as the major product by appropriate selection of the R groups for the phosphine which forms the $R_3P$ moiety. As a rough indication of the effect of various types of R groups in the phosphine, the following is a listing of R group types in the order generally exhibited for decreasing electron-accepting ability: aryl; aralkenyl; aralkyl; alkenyl; cycloalkenyl; saturated hydrocarbon groups (alkyl or cycloalkyl) attached to the phosphorous atom through a primary carbon atom; and saturated hydrocarbon groups attached to the phosphorous atom through a secondary or tertiary carbon atom. However, this order is subject to variation depending upon the specific hydrocarbon groups involved. For instance, an aralkyl group in which the alkyl moiety is long or an alkenyl group where the double bond is remote from the carbon atom attached to the phosphorous atom can cause the catalyst to function in substantially the same way as if it were prepared from a phosphine in which the R group is alkyl.

The present catalyst, in addition to effecting dimerization, can also cause isomerization of the double bond in the olefinic product and to some extent in the starting olefin. Hence the position of the double bond in the dimer product will depend upon the specific conditions under which the reaction is carried out and particularly the length of time at which the dimer is allowed to remain in contact with the catalyst system. For example, when propylene is dimerized using a catalyst in which the phosphine is triphenylphospine, the main dimer initially formed is 4-methylpentene-2; but if this is allowed to remain in contact with the catalyst for substantial time, it tends to isomerize to other methylpentenes. When tricyclohexylphosphine is used instead, the main initial dimer is 2,3-dimethylbutene-1, especially when the reaction temperature is relatively low (e.g., $-50°$ C. to $25°$ C.); but continued contact of this product with the catalyst tends to cause isomerization to 2,3-dimethylbutene-2. Prolonged contact of the product with the catalyst system after the charge olefin has been consumed can also cause part of the product to dimerize and yield products of still higher molecular weight.

When the desired product from propylene dimerization is 2,3-dimethylbutene, it is best that all R groups in the $R_3P$ moiety of the nickelate complex used to form the catalyst be saturated hydrocarbon groups attached to the phosphorous through a secondary or tertiary carbon atom. Also the reaction temperature for producing this particular dimer should be below $25°$ C., e.g., $0°$ C. or lower, since the selectivity for its production from propylene improves as the temperature decreases.

As previously indicated, a solvent preferably is employed in carrying out the present process. The solvent can be a saturated or aromatic hydrocarbon or various halogenated hydrocarbons can be used. It must be capable of dissolving the catalyst and must be liquid at the temperature and pressure conditions employed. Liquid aromatic hydrocarbons, such as benzene, toluene or xylene, function well as solvents for the present catalyst systems. Solvents having some degree of polarity may result in highest catalytic activity; however, solvents which have high dipole moments, such as water, alcohols, ketones, esters, amines, dioxane and tetrahydrofuran, will irreversibly coordinate with the nickel and deactivate the catalyst. The best solvents are halogenated aliphatic and aromatic compounds in which the halogen is chlorine, bromine, fluorine or combinations of such substituents but these are generally more expensive than the aromatic hydrocarbon solvents. Liquid aliphatic hydrocarbons can also be employed as solvents when the catalyst components used have sufficient solubility therein, but they are usually not as satisfactory as the aromatic hydrocarbon solvents.

Halohydrocarbons that are suitable as the solvent medium are halobenzenes having 1-2 halogen atoms, trihaloethanes, tetrahaloethanes, trihaloethylenes and tetrahaloethylenes, in which halohydrocarbons the halogen can be chlorine, bromine or fluorine or combinations of such substituents. Particularly suitable solvents are the monohalobenzenes, viz, chlorobenzene, bromobenzene and fluorobenzene, and dihalobenzenes which are liquid at the reaction temperature such as ortho- and meta-dichlorobenzenes, dibromobenzenes or difluorobenzenes. Examples of other halohydrocarbons that can be used are: methyl chloroform; methyl bromoform; 1,1,2-trichloroethane; 1,1,2,2-tetrachloroethane; trifluoroethanes; tribromoethanes; chlorodifluoroethanes; trichlorotrifluoroethanes; tetrafluoroethanes; and similar ethylene derivatives containing 2-4 halogen atoms which are chlorine, bromine and/or fluorine. Many other halogenated hydrocarbon solvents can also be used.

The trihalonickelate complexes used in forming the present catalysts are known types of compounds and their preparation has been described by Cotton et al., JACS, 83, 344-351 (1961). One method of preparing the phosphonium complexes involves heating a mixture of a trihydrocarbylphosphine (2 moles), a nickel (II) halide (1 mole) and a hydrocarbyl halide (1 mole) to effect reaction as shown in Equation I.

I

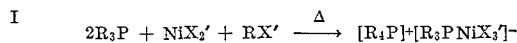

$$2R_3P + NiX_2' + RX' \xrightarrow{\Delta} [R_4P]^+[R_3PNiX_3']^-$$

A specific example of this is the reaction of triphenylphosphine, nickel chloride and n-butyl chloride, as illustrated by Equation II.

II

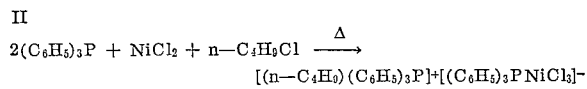

$$2(C_6H_5)_3P + NiCl_2 + n-C_4H_9Cl \xrightarrow{\Delta}$$
$$[(n-C_4H_9)(C_6H_5)_3P]^+[(C_6H_5)_3PNiCl_3]^-$$

The product in this case is n-butyltriphenylphosphonium triphenylphosphinetrichloronickelate.

Analogous phosphonium salts for use in practicing the invention can also be made by substituting HCl, HBr or HI for RX' in the reaction. As an example of this, triisopropylphosphine, nickel bromide and hydrogen chloride can be reacted as set forth in Equation III.

III

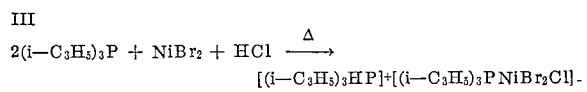

$$2(i-C_3H_5)_3P + NiBr_2 + HCl \xrightarrow{\Delta}$$
$$[(i-C_3H_5)_3HP]^+[(i-C_3H_5)_3PNiBr_2Cl]^-$$

Here the product is triisopropylphosphonium triisopropylphosphinechlorodibromonickelate. This constitutes an example wherein one R in the anion $(R_4P)^+$ is hydrogen while the other R's are alkyl groups.

An alternative procedure equivalent to the method indicated by Equation I is to react bis(trihydrocarbylphosphine)nickel halides with hydrocarbyl halides or hydrogen halides to give the product of Equation I. Such nickel halide complexes are known and have been described in "Advances in Inorganic and Radiochemistry," vol. 6, pp. 27-30, Academic Press (1964). An example of this reaction is shown in Equation IV wherein bis(triphenylphosphine)nickel chloride is reacted with n-octyl chloride.

IV.

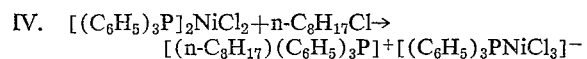

$$[(C_6H_5)_3P]_2NiCl_2 + n-C_8H_{17}Cl \rightarrow$$
$$[(n-C_8H_{17})(C_6H_5)_3P]^+[(C_6H_5)_3PNiCl_3]^-$$

The product in this case is n-octyltriphenylphosphonium triphenylphosphinetrichloronickelate.

Another procedure for preparing the phosphonium complexes comprises reacting equimolar amounts of nickel halide, a trihydrocarbylphosphine and a tetrahydrocarbylphosphonium halide in a hot solvent such as butanol. Equation V is an illustration of this wherein the phosphine is tricyclohexylphosphine and the phosphonium reactant is tetraethylphosphonium chloride.

V.

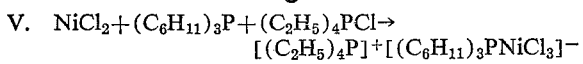

$$NiCl_2 + (C_6H_{11})_3P + (C_2H_5)_4PCl \rightarrow$$
$$[(C_2H_5)_4P]^+[(C_6H_{11})_3PNiCl_3]^-$$

The product in this case is tetraethylphosphonium tricyclohexylphosphinetrichloronickelate.

A procedure like that of Equation V can be used to prepare the analogous ammonium salts by using a substituted ammonium halide in place of the phosphonium halide reactant. Equation VI illustrates this procedure utilizing as reactants tri-t-butylphosphine and tetraphenylammonium bromide with nickel bromide.

VI.

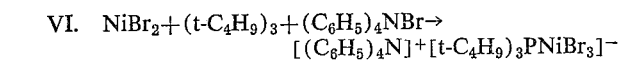

$$NiBr_2 + (t-C_4H_9)_3 + (C_6H_5)_4NBr \rightarrow$$
$$[(C_6H_5)_4N]^+[t-C_4H_9)_3PNiBr_3]^-$$

The product in this instance is tetraphenylammonium tri-t-butyl-phosphinetribromonickelate.

The so-prepared phosphonium or ammonium nickelate complex is dissolved in a solvent as described above, and the Lewis acid, which preferably is $RAlX_2$ or $R_3Al_2X_3$ and most preferably is the sesquihalide, is added in a proportion such that in excess of two atoms of aluminum are provided per atom of nickel in the complex. Preferably the proportion of Lewis acid to the complex is well in excess of this proportion. While it is not known with certainty, it is believed that the resulting catalyst is a species formed by the combination of one mole of the nickelate salt with at least two moles of the Lewis acid (i.e., the equivalent of at least two aluminum atoms per atom of nickel). The use of the Lewis acid in less than this 2:1 molar ratio is substantially inoperative. It is distinctly preferable to employ a large excess of the Lewis acid such that the atomic ratio of Al:Ni is in the range of 10:1 to 100:1, and the most desirable ratio generally is of the order 20-30:1. Much larger Al:Ni ratios (e.g., 500:1) are within the scope of the invention. The excess Lewis acid over the 2:1 ratio of Al:Ni acts as a scavenger for impurities, such as moisture and oxygen, which may be present, and also this excess develops the active catalyst species more completely. A large excess of the Lewis acid also is particularly important when an iodide of nickel has been used to prepare the coordination complex (i.e., where at least two X's are iodine), as development of the active catalyst depends upon chlorine or bromine being interchanged with iodine upon addition of the Lewis acid. A large excess of the Lewis acid aids this interchange.

When the nickelate complex and the Lewis acid are mixed, a distinct color change occurs. This color change seems to be indicative of the formation of the desired catalyst species. For example, solutions of the trichloro or tribromonickelates may have colors ranging from blue to green, but upon addition of the Lewis acid the color changes to amber-yellow. These distinct color changes are useful in indicating that the desired catalyst has been formed.

In forming the catalyst as above described, it is distinctly desirable that addition of the Lewis acid to the nickelate complex solution be done in the presence of the olefin to be reacted or, alternatively, another olefin. The preferred procedure is to dissolve a quantity of the olefin in the nickelate complex solution and then mix in the desired amount of Lewis acid. Presence of the olefin in the mixture during addition of the Lewis acid stabilizes the resulting catalyst and gives a more highly active catalyst system than when the components are mixed in the absence of olefin. Usually it is desirable in activating the catalyst to utilize the same olefin as is to be reacted in the process, although a different olefin in limited quantity can be employed in this activation step if desired. For example, propylene under moderate pressure can first be applied to the nickelate complex solution and the Lewis acid then admixed therewith to activate the catalyst, following which another olefin, e.g., hexene-1, can be fed into the mixture to undergo dimerization.

When a highly polar material, e.g., water, is mixed with the catalyst solution, it reacts and causes deactivation of the catalyst. This procedure can be employed, if desired, to deactivate the catalyst after the olefin dimerization reaction has been completed.

Application of the catalyst, prepared as above described, for dimerizing olefins, can be effected merely by contacting the colored catalyst solution with the olefin at any temperature in the range of −100° C. to 200° C. which provides a suitable rate of reaction. As previously stated, any monoolefin which has no side substituents at the carbon atoms which form the double bond can be made to dimerize by means of these catalysts. Suitable temperatures of reaction will depend upon the reactivity of the particular monomer being charged. The reaction occurs in solution. Hence, when the starting olefin would otherwise be gaseous at the reaction temperature selected, sufficient pressure should be used to give it substantial solubility in the catalyst solution.

When the charge is one or more aliphatic olefins of the $C_2$–$C_{10}$ range, a temperature in the range of −50° C. to 100° C. generally is preferred, and for the $C_4$–$C_{10}$ olefins it is usually desirable to operate at temperatures below 25° C. since higher temperatures tend to cause the activity of the catalyst to decrease. With the lower olefins sufficient pressure and also adequate agitation are used so that the gaseous feed will rapidly dissolve in the solution so as to maintain an adequate concentration thereof as the reaction proceeds. The temperature level at which the reaction is carried out can have an effect on the structure of the product obtained. For example, in the dimerization of propylene low temperature favors the production of 2,3-dimethylbutene while high temperature favors the formation of methylpentene. Thus, when the desired product is 2,3-dimethylbutene, not only should R in the catalyst be an electron-donating group such as cyclohexyl or isopropyl but the temperature selected preferably should be in the range of −50° C. to 25° C. On the other hand, when the objective is to produce methylpentene, R should be an electron-accepting group such as phenyl or naphthyl and temperatures in the range of 25–100° C. are quite satisfactory, although methylpentenes usually are also the major product even at low temperatures when the R groups in the catalyst are of the latter type.

The dimerization reaction can be carried out batchwise or in continuous manner. In the latter case the catalyst solution can be circulated through a contact zone, such as a tank or column, to which the olefin as either a gas or liquid can be continuously or intermittently fed. The reaction zone is maintained at the desired reaction temperature by cooling or heating as required. A stream of catalyst solution containing the reaction product is withdrawn from the contact zone and is introduced into a distillation zone to strip out the reaction product including dimer and any higher boiling material that may have been formed. When operating in this manner a solvent should be selected with a sufficiently high boiling point so that the reaction product can readily be distilled therefrom, leaving as bottoms a solvent solution of the catalyst. This catalyst solution is recycled to the contact zone for reuse. If desired the overhead product can be cohobated to separately recover the dimer fraction from the higher boiling material.

When the olefin charge is contacted in gaseous form with the catalyst solution, as normally will be the case when a lower olefin is used such as ethylene, propylene or butenes, the reaction rate will depend not only on the temperature selected but also on the gas pressure, since the pressure will determine the concentration level of the gas dissolved in the solvent for contact with the catalyst. The pressure can be regulated to achieve the rate of dimerization desired. As previously mentioned, the catalyst also tends to cause isomerization of the double bond position in the dimer product. This reaction, however, is not related to pressure when the process is conducted at a temperature below the boiling point of the dimer. Hence, by carrying out the reaction at a relatively high pressure to effect dimerization at a rapid rate and then removing dimer from the solution soon after it has been formed, isomerization of the product can be minimized. This procedure is advantageous, for example, when it is desired to maximize production of 4-methylpentene-2 from propylene using triphenylphosphine as the $PR_3$ component or of 2,3-dimethylbutene-1 using tricyclohexylphosphine in the catalyst.

The following examples are specific illustrations of the invention:

EXAMPLE 1

Propylene was dimerized by means of the catalyst resulting from combining tetraisopropylphosphonium triisopropylphosphinetribromonickelate with ethylaluminum sesquichloride. The nickel complex had been prepared by a reaction analogous to Equation IV, wherein equimolar amounts of bis(triisopropylphosphine)nickel dibromide and isopropylbromide were reacted in chlorobenzene solution at 150° C. Recrystallization of the product from chlorobenzene by addition of pentane as antisolvent gave the above designated nickelate,

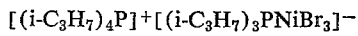

as blue crystals melting at 198–200° C. Specifically, the dimerization reaction was carried out in the following manner. A 250 ml. flask provided with a magnetic agitator, means for cooling, temperature indicating means, and means for applying and maintaining a regulated pressure of propylene in the flask was used. The flask first was charged with 60 ml. of a 0.0004 molar solution in chlorobenzene of the nickelate complex, and nitrogen was bubbled through the solution for 10 minutes to effect deaeration. The solution was cooled to 0° C., propylene pressure of 100 mm. Hg above atmospheric pressure was next applied, and then while the mixture was being stirred the Lewis acid was added in amount to provide an atomic ratio of Al:Ni of 30:1. As dimerization occurred additional propylene was admitted to maintain the propylene pressure. The reaction was continued for a total of 15 minutes and then was stopped by the addition of a small amount of aqueous alcohol to the flask in order to deactivate the catalyst. The amount of propylene consumed during the 15 minute reaction period was measured and the corresponding average rate of reaction was calculated to be about 400 kg./g. nickel/hr. No major change in reaction rate during the reaction period occurred, thus showing that catalyst activity throughout the run remained substantially unchanged. VPC analysis of the reaction product showed that it was composed by weight of 84% dimers and 16% higher oligomers, and that the dimer fraction contained 84% of 2,3-dimethylbutenes and 8% of 2-methylpentene-1 with the remainder being 4-methylpentene-2 and hexene-2.

The foregoing example illustrates the high rate of dimerization that can be attained by means of the present catalysts. It also illustrates the high selectivity in dimerizing propylene to 2,3-dimethylbutenes when the R groups in the $R_3P$ moiety of the catalyst are saturated and attached to the phosphorous atom through secondary or tertiary carbon atoms.

EXAMPLE 2

In this example the nickelate complex was a substituted ammonium salt, specifically tetraethylammonium triphenylphosphinetribromonickelate, and the Lewis acid again was ethylaluminum sesquichloride. The nickelate complex had been made by a procedure analogous to Equation VI by reacting equimolar amounts of nickel bromide, triphenylphosphine and tetraethylammonium bromide in hot butanol. The resulting complex had a blue-green color and melted at 266° C. It was used in combination with the Lewis acid (Al:Ni ratio=30:1) in toluene solution at 0° C. to dimerize propylene in the same manner and under essentially the same conditions as described in Example 1. The average reaction rate over 15 minutes of reaction time was about 150 kg. of propylene/g. of nickel/hr. Analysis of the product showed that it was composed by weight of 82% dimers and 18% higher oligomers, and that the dimer fraction had the following composition:

| | Percent |
|---|---|
| 2-methylpentene-2 | 43 |
| 4-methylpentene-2 | 38 |
| 2,3-dimethylbutenes | 8 |
| n-hexenes | 8 |
| 4-methylpentene-1 | 3 |

These results show that catalysts made from the substituted ammonium nickelates as herein described also have good dimerizing activities, although their activities generally are not as high as in the case of the phosphonium nickelates. The results also illustrate the fact that when the R's in the $R_3P$ moiety are aryl groups the catalyst causes propylene to dimerize mainly to methylpentenes rather than 2,3-dimethylbutenes.

EXAMPLE 3

The catalyst system was prepared by dissolving 0.02 millimole of bis(triisopropylphosphine)nickel dichloride in 50 ml. of benzene, bubbling nitrogen through the mixture for 10 minutes to effect deaeration, reacting same with a substantially stoichiometric amount of anhydrous HCl at room temperature and then adding 0.30 millimole of ethylaluminum sesquichloride dissolved in heptane. Here the procedure for making the nickelate component is analogous to Equation IV, the resulting nickelate component specifically being triisopropylphosphonium triisopropylphosphine trichloronickelate. The atomic ratio of Al:Ni was 15:1 and the resulting catalyst had a characteristic yellow color. The mixture was cooled to 0° C. and continuously stirred, and a propylene pressure of 2 p.s.i.g. was applied and maintained throughout a 15 minute reaction period. During this time 52.5 g. of propylene reacted, which corresponds to a reaction rate of 175 kg./g. Ni/hr. VPC analysis of the product showed 86.3% of dimers and 13.7% of trimers. The dimer fraction contained about 83% by weight of 2,3-dimethylbutenes. Thus about 72 g. of 2,3-dimethylbutenes were formed per 100 g. of propylene reacted.

Example 3 is an illustration of the use of a catalyst wherein Q is phosphorous and one of the R groups of the $R_4Q$ moiety is hydrogen. Again it is shown that the character of the R groups in the $R_3P$ moiety determine the structure of the main dimer product. Since in this instance these R groups are of high electron-donating character (isopropyl), the main dimer product is doubly branched.

EXAMPLE 4

A run made under the same conditions as Example 1 except that ethylene is substituted for propylene results in a reaction rate of about 150 kg. of ethylene/g. Ni/hr. The reaction product is composed of about 80% by weight of butene-1 in admixture with minor amounts of hexenes and octenes.

EXAMPLE 5

Another run is made under substantially the same conditions and with the same catalyst as used in Example 1, except that the olefin monomer is octene-1 which, after deaeration of the catalyst solution, is added as 30 ml. of liquid octene-1. At the end of 4 hrs. reaction at 0° C., about 80% of the octene-1 has dimerized to $C_{16}$ olefins of various structures.

When other phosphonium or ammonium trihalonickelate complexes as herein defined are substituted for the nickelate salts used in the foregoing examples, substantially equivalent results are obtained. Also the use of $RAlX_2$ or $R_2AlX$ in place of $R_3Al_2X_3$ yields catalysts effective for purposes of the invention, although the resulting catalysts generally are not as highly active as when the Lewis acid is a sesquichloride or sesquibromide. Olefin hydrocarbons other than those shown in the foregoing examples can be dimerized in analogous fashion by means of the present catalysts, provided that the olefin monomer has its double bond between carbon atoms neither of which has a side substituent.

We claim:
1. A catalyst system which is a combination of (1) a trihalonickelate complex having the formula
$$(R_4Q)^+(R_3PNiX_3')^-$$
with (2) a Lewis acid of the group $RAlX_2$, $R_3Al_2X_3$ and $R_2AlX$, wherein Q is phosphorus or nitrogen, X' is chlorine, bromine or iodine, X is chlorine or bromine and all R's are hydrocarbyl radicals except that when Q is phosphorous one of the R's in the $(R_4Q)^+$ cation can be hydrogen and when Q is nitrogen all R's in said cation are hydrocarbyl groups having at least two carbon atoms, the atomic ration of Al:Ni in the system being in excess of 2:1.

2. A catalyst system according to claim 1 wherein Q is phosphorous.

3. A catalyst system according to claim 2 wherein said Lewis acid is $RAlX_2$ or $R_3Al_2X_3$.

4. A catalyst system according to claim 3 wherein X' is chlorine or bromine.

5. A catalyst system according to claim 2 wherein the atomic ratio of Al:Ni is in the range of 10:1 to 100:1.

6. A catalyst system according to claim 5 wherein said Lewis acid is $R_3Al_2X_3$.

7. A catlayst system according to claim 1 wherein Q is nitrogen.

8. A catalyst system according to claim 7 wherein said Lewis acid is $RAlX_2$ or $R_3Al_2X_3$.

9. A catalyst system according to claim 8 wherein X' is chlorine or bromine.

10. A catalyst system according to claim 7 wherein the atomic ratio of Al:Ni is in the range of 10:1 to 100:1.

11. A catalyst system according to claim 10 wherein said Lewis acid is $R_3Al_2X_3$.

12. A process for dimerizing an olefinic hydrocarbon which comprises contacting a monoolefin having a double bond between two carbon atoms neither of which is attached to more than one other carbon atom with a liquid solution of a catalyst system as defined in claim 1 and at a temperature in the range of $-100°$ C. to $200°$ C.

13. A process according to claim 12 wherein said temperature is in the range of $-50°$ C. to $100°$ C.

14. A process according to claim 12 wherein Q is phosphorous.

15. A process according to claim 14 wherein said Lewis acid is $RAlX_2$ or $R_3Al_2X_3$.

16. A process according to claim 15 wherein X' is bromine or chlorine.

17. A process according to claim 14 wherein X' is bromine or chlorine, the atomic ratio of Al:Ni is in the range of 10:1 to 100.1, and said temperature is in the range of $-50°$ C. to $100°$ C.

18. A process according to claim 14 wherein said olefin is a $C_2$-$C_{10}$ aliphatic olefin.

19. A process acording to claim 18 wherein said olefin is propylene.

20. A process according to claim 19 wherein at least one R in the $R_3P$ moiety is aryl and the main dimerization product is methylpentene.

21. A process according to claim 19 wherein all R's in the $R_3P$ moiety are saturated hydrocarbon groups attached to the phosphorous atom through a secondary or tertiary carbon atom, said temperature is in the range of $-50°$ C. to $25°$ C., and the main dimerization product is 2,3-dimethylbutene.

22. A process according to claim 12 wherein Q is nitrogen.

23. A process according to claim 22 wherein said Lewis acid is $RAlX_2$ or $R_3Al_2X_3$.

24. A process according to claim 23 wherein X' is bromine or chlorine.

25. A process according to claim 22 wherein X' is bromine or chlorine, the atomic ratio of Al:Ni is in the range of 10:1 to 100:1, and said temperature is in the range of −50° C. to 100° C.

26. A process according to claim 22 wherein said olefin is a $C_2$–$C_{10}$ aliphatic olefin.

27. A process according to claim 26 wherein said olefin is propylene.

28. A process according to claim 27 wherein at least one R in the $R_3P$ moiety is aryl and the main dimerization product is methylpentene.

29. A process according to claim 27 wherein all R's in the $R_3P$ moiety are saturated hydrocarbon groups attached to the phosphorous atom through a secondary or tertiary carbon atom, said temperature is in the range of −50° C. to 25° C., and the main dimerization product is 2,3-dimethylbutene.

30. A process according to claim 12 wherein said olefin is propylene, X' is chlorine or bromine, said Lewis acid is $RAlX_2$ or $R_3Al_2X_3$, and the atomic ratio of Al:Ni is in the range of 10:1 to 100:1.

31. A process according to claim 30 wherein each R group in the catalyst components has not more than eight carbon atoms.

32. A process according to claim 31 wherein all R's in the $R_3P$ moiety are saturated hydrocarbon groups attached to the phosphorous atom through a secondary or tertiary carbon atom, said temperature is below 25° C., and the main dimerization product is 2,3-dimethylbutene.

33. A process according to claim 32 wherein Q is phosphorous.

34. A process according to claim 32 wherin Q is nitrogen.

35. A catalyst system according to claim 2 wherein each R group in the catalyst components has not more than eight carbon atoms.

36. A catalyst system according to claim 5 wherein each R group in the catalyst components has not more than eight carbon atoms.

37. A catalyst system according to claim 7 wherein each R group in the catalyst components has not more than eight carbon atoms.

38. A catalyst system according to claim 10 wherein each R group in the catalyst components has not more than eight carbon atoms.

39. A process according to claim 14 wherein each R group in the catalyst components has not more than eight carbon atoms.

40. A process according to claim 22 wherein each R group in the catalyst components has not more than eight carbon atoms.

References Cited

UNITED STATES PATENTS

| | | | |
|---|---|---|---|
| 3,306,948 | 2/1967 | Kealy | 260—680 |
| 3,355,510 | 11/1967 | Cannell et al. | 260—683.15 |

PAUL M. COUGHLAN, Jr., Primary Examiner

U.S. Cl. X.R.

252—429; 260—94